(12) United States Patent
Hirai et al.

(10) Patent No.: US 12,173,425 B2
(45) Date of Patent: Dec. 24, 2024

(54) SILVER-PLATED PRODUCT AND METHOD FOR PRODUCING SAME

(71) Applicant: DOWA METALTECH CO., LTD., Tokyo (JP)

(72) Inventors: Yutaro Hirai, Tokyo (JP); Kentaro Arai, Tokyo (JP); Yosuke Sato, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 0 days.

(21) Appl. No.: 17/910,250

(22) PCT Filed: Jan. 21, 2021

(86) PCT No.: PCT/JP2021/001990
§ 371 (c)(1),
(2) Date: Sep. 8, 2022

(87) PCT Pub. No.: WO2021/181901
PCT Pub. Date: Sep. 16, 2021

(65) Prior Publication Data
US 2023/0093655 A1    Mar. 23, 2023

(30) Foreign Application Priority Data
Mar. 9, 2020   (JP) ................... 2020-039708

(51) Int. Cl.
*B32B 15/01*    (2006.01)
*B32B 15/04*    (2006.01)
(Continued)

(52) U.S. Cl.
CPC ............... *C25D 5/10* (2013.01); *B32B 15/01* (2013.01); *B32B 15/018* (2013.01); *B32B 15/04* (2013.01);
(Continued)

(58) Field of Classification Search
CPC ... C25D 3/12; C25D 3/22; C25D 3/46; C25D 5/10; C25D 5/12; C25D 5/34; C25D 7/00;
(Continued)

(56) References Cited

U.S. PATENT DOCUMENTS 4,601,958 A * 7/1986 Levine ................. C25D 5/14
    257/710
4,835,067 A * 5/1989 Levine ................. B32B 15/018
    428/669

FOREIGN PATENT DOCUMENTS

JP     58-1089 A      1/1983
JP     58-181888 A    10/1983
(Continued)

OTHER PUBLICATIONS

International Search Report dated Mar. 16, 2021 for corresponding application PCT/JP2021/001990.

*Primary Examiner* — Michael E. La Villa
(74) *Attorney, Agent, or Firm* — Bachman & LaPointe, P.C.

(57) ABSTRACT

A silver-plated product which has more excellent minute sliding abrasion resistance property than that of conventional silver-plated products, and a method for producing the same. The silver-plated product is produced by electroplating a base material 10 of copper or a copper alloy to form an underlying plating layer 12 of nickel or a nickel alloy, a first silver-plating layer of silver (lower silver-plating layer) 14, a zinc-plating layer 16 of zinc serving as an intermediate plating layer, and a second silver-plating layer of silver (upper silver-plating layer) 18 serving as a surface layer, in this order from the base material 10.

25 Claims, 1 Drawing Sheet

(51) Int. Cl.
| | |
|---|---|
| *B32B 15/18* | (2006.01) |
| *B32B 15/20* | (2006.01) |
| *C23C 28/02* | (2006.01) |
| *C23C 30/00* | (2006.01) |
| *C23G 1/10* | (2006.01) |
| *C25D 3/12* | (2006.01) |
| *C25D 3/22* | (2006.01) |
| *C25D 3/46* | (2006.01) |
| *C25D 5/10* | (2006.01) |
| *C25D 5/12* | (2006.01) |
| *C25D 5/34* | (2006.01) |
| *C25D 7/00* | (2006.01) |
| *C25F 1/00* | (2006.01) |
| *H01R 4/58* | (2006.01) |

(52) U.S. Cl.
CPC ............ *B32B 15/043* (2013.01); *B32B 15/18* (2013.01); *B32B 15/20* (2013.01); *C23C 28/02* (2013.01); *C23C 28/021* (2013.01); *C23C 28/023* (2013.01); *C23C 28/025* (2013.01); *C23C 30/00* (2013.01); *C23C 30/005* (2013.01); *C23G 1/103* (2013.01); *C25D 3/12* (2013.01); *C25D 3/22* (2013.01); *C25D 3/46* (2013.01); *C25D 5/12* (2013.01); *C25D 5/34* (2013.01); *C25D 7/00* (2013.01); *C25F 1/00* (2013.01); *H01R 4/58* (2013.01); *Y10T 428/12792* (2015.01); *Y10T 428/12875* (2015.01); *Y10T 428/12882* (2015.01); *Y10T 428/12896* (2015.01); *Y10T 428/12903* (2015.01); *Y10T 428/1291* (2015.01); *Y10T 428/12931* (2015.01); *Y10T 428/12944* (2015.01); *Y10T 428/12993* (2015.01); *Y10T 428/24942* (2015.01); *Y10T 428/2495* (2015.01); *Y10T 428/24959* (2015.01); *Y10T 428/24967* (2015.01); *Y10T 428/24975* (2015.01); *Y10T 428/24983* (2015.01); *Y10T 428/26* (2015.01); *Y10T 428/263* (2015.01); *Y10T 428/264* (2015.01); *Y10T 428/265* (2015.01)

(58) Field of Classification Search
CPC ....... B32B 15/018; B32B 15/01; B32B 15/04; B32B 15/043; B32B 15/18; B32B 15/20; C23G 1/103; C25F 1/00; H01R 4/58; C23C 28/02; C23C 28/021; C23C 28/023; C23C 28/025; C23C 30/00; C23C 30/005; Y10T 428/12792; Y10T 428/12875; Y10T 428/12882; Y10T 428/12896; Y10T 428/12903; Y10T 428/1291; Y10T 428/12931; Y10T 428/12944; Y10T 428/12993; Y10T 428/24942; Y10T 428/2495; Y10T 428/24959; Y10T 428/24967; Y10T 428/24975; Y10T 428/24983; Y10T 428/26; Y10T 428/263; Y10T 428/264; Y10T 428/265
See application file for complete search history.

(56) References Cited

FOREIGN PATENT DOCUMENTS

| | | |
|---|---|---|
| JP | 58-221291 A | 12/1983 |
| JP | 61-124597 A | 6/1986 |
| JP | 61-177394 A | 8/1986 |
| JP | 1-122507 A | 5/1989 |
| JP | 2011-122234 A | 6/2011 |
| JP | 2019002056 A | 1/2019 |

* cited by examiner

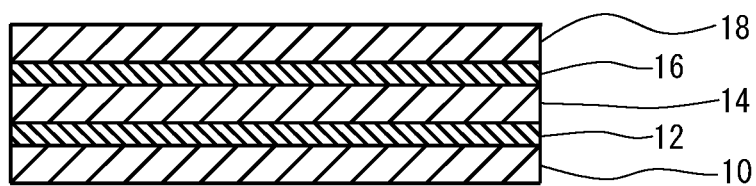

SILVER-PLATED PRODUCT AND METHOD FOR PRODUCING SAME

BACKGROUND OF THE INVENTION

The present invention generally relates to a silver-plated product and a method for producing the same. More specifically, the invention relates to a silver-plated product used as the material of contact and terminal parts, such as connectors, switches and relays, which are used for on-vehicle and/or household electric wiring, and a method for producing the same.

As conventional materials of contact and terminal parts, such as connectors and switches, there are used plated products wherein a base material of copper, a copper alloy, stainless steel or the like, which are relatively inexpensive and which have excellent corrosion resistance, mechanical characteristics and so forth, is plated with tin, silver, gold or the like in accordance with required characteristics, such as electrical and soldering characteristics.

Tin-plated products obtained by plating a base material of copper, a copper alloy, stainless steel or the like, with tin are inexpensive, but they do not have good corrosion resistance in a high-temperature environment. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

The materials of contact and terminal parts, such as connectors and switches, are also required to have good wear resistance against the insertion and extraction of connectors and/or the sliding movements of switches.

However, silver-plated products are soft and easy to wear. For that reason, if the silver-plated product is used as the material of a connecting terminal or the like, there is a problem in that the insertion and extraction and/or sliding movement of the connecting terminal or the like easily cause the adhesion thereof to cause the adhesive abrasion thereof. There is also a problem in that the surface of the connecting terminal is shaved to enhance the coefficient of friction thereof to enhance the insertion force thereof during the insertion of the connecting terminal.

In order to solve such problems, there is proposed a metallic material which comprises: a base material of copper or a copper alloy; a silver coating layer laminated as the uppermost surface of the base material; and a plating layer of copper, nickel, zinc, chromium or an alloy containing at least one of these metals, the plating layer being provided as an intermediate layer between the base material and the silver coating layer, wherein the surface of the silver coating layer has an arithmetic average roughness Ra of not less than 0.1 μm and not larger than 10 μm and wherein an indentation hardness, which is measured when an indenter is pushed into the central position in thickness directions from the surface of the silver coating layer, is not less than 0.3 times and not higher than 1 time as large as the indentation hardness of the base material (see, e.g., Patent Document 1).

PRIOR ART DOCUMENT(S)

Patent Document(s)

Patent Document 1: JP 2019-2056 A (Paragraph Numbers 0006)

SUMMARY OF THE INVENTION

However, if the metallic material disclosed in Patent Document 1 is used as the material of terminal parts, there is a problem in that the abrasion (minute sliding abrasion) of the outermost silver-plating layer is easily caused by sliding for a slight distance between contact points of male and female terminals, so that the contact reliability of the terminal is deteriorated by such minute sliding abrasion.

It is therefore an object of the present invention to eliminate the aforementioned problems and to provide a silver-plated product which has more excellent minute sliding abrasion resistance property than that of conventional silver-plated products, and a method for producing the same.

In order to accomplish the aforementioned object, the inventors have diligently studied and found that it is possible to produce a silver-plated product which has more excellent minute sliding abrasion resistance property than that of conventional silver-plated products, if a base material has a first silver-plating layer, a zinc-plating layer serving as an intermediate plating layer, and a second silver-plating layer serving as a surface layer, wherein the first silver-plating layer, the zinc-plating layer and the second silver-plating layer are formed in this order from the base material. Thus, the inventors have made the present invention.

According to the present invention, there is provided a silver-plated product comprising: a base material; a first silver-plating layer; a zinc-plating layer serving as an intermediate plating layer; and a second silver-plating layer serving as a surface layer, wherein the base material has the first silver-plating layer, the zinc-plating layer and the second silver-plating layer, and wherein the first silver-plating layer, the zinc-plating layer and the second silver-plating layer are formed in this order from the base material.

In this silver-plated product, the first silver-plating layer preferably has a thickness of 0.1 to 10 μm, and the zinc-plating layer preferably has a thickness of 0.1 to 5 μm. The ratio of the thickness of the first silver-plating layer to the thickness of the zinc-plating layer is preferably 0.1 to 10. The second silver-plating layer preferably has a thickness of 0.1 to 10 μm. Between the base material and the first silver-plating layer, an underlying plating layer is preferably formed. The underlying plating layer is preferably made of nickel or a nickel alloy, and preferably has a thickness of 0.1 to 5 μm. The base material is preferably made of copper or a copper alloy, and the silver-plated product preferably has a Vickers hardness HV of 80 to 220.

According to the present invention, there is provided a method for producing a silver-plated product, the method comprising the steps of: preparing a base material; and causing the base material to have a first silver-plating layer, a zinc-plating layer serving as an intermediate plating layer, and a second silver-plating layer serving as a surface layer, wherein the first silver-plating layer, the zinc-plating layer, and the second silver-plating layer are formed by electroplating in this order from the base material.

In this method for producing a silver-plated product, the first silver-plating layer and the second silver-plating layer are preferably formed by electroplating in a silver-plating solution of an aqueous solution containing silver potassium cyanide, potassium cyanide and potassium selenocyanate. The first silver-plating layer preferably has a thickness of 0.1 to 10 μm, and the zinc-plating layer preferably has a thickness of 0.1 to 5 μm. The ratio of the thickness of the first silver-plating layer to the thickness of the zinc-plating layer is preferably 0.1 to 10. The second silver-plating layer preferably has a thickness of 0.1 to 10 μm. Between the base material and the first silver-plating layer, an underlying plating layer is preferably formed by electroplating. The underlying plating layer is preferably made of nickel or a nickel alloy, and preferably has a thickness of 0.1 to 5 μm. The base material is preferably made of copper or a copper alloy.

According to the present invention, it is possible to provide a silver-plated product which has more excellent minute sliding abrasion resistance property than that of conventional silver-plated products, and a method for producing the same.

BRIEF DESCRIPTION OF THE DRAWING

FIG. 1 is a sectional view schematically showing the preferred embodiment of a silver-plated product according to the present invention.

DETAILED DESCRIPTION

Referring to the accompanying drawing, the preferred embodiment of a silver-plated product and a method for producing the same according to the present invention will be described below in detail.

In the preferred embodiment of a silver-plated product shown in FIG. 1, a base material 10 has an underlying plating layer 12, a first silver-plating layer of silver (lower silver-plating layer) 14, a zinc-plating layer 16 of zinc serving as an intermediate plating layer, and a second silver-plating layer of silver (upper silver-plating layer) 18 serving as a surface layer, which are formed in this order from the base material 10.

If the zinc-plating layer 16 serving as the intermediate plating layer is thus formed between the first silver-plating layer 14 and the second silver-plating layer 18, it is possible to form an alloy of zinc and silver on the interfaces between the respective plating layers to enhance the hardness of the silver-plated product. In addition, when the silver-plated product is used as the material of contact terminals or the like, it is possible to suppress the adhesion thereof from being caused by the insertion and extraction thereof and/or the sliding movement thereof, to suppress the adhesive wear thereof.

In the silver-plated product in this preferred embodiment, the first silver-plating layer 14 and the second silver-plating layer 18 preferably have a high electrical conductivity. The first silver-plating layer 14 and the second silver-plating layer 18 are made of 99% by weight or more of silver, and may contain small amounts of other elements than silver (for example, small amounts of elements, such as Se and Sb, due to brighteners, impurities and so forth). The thickness of the first silver-plating layer 14 is preferably 0.1 to 10 μm, more preferably 0.2 to 8 μm and most preferably 0.3 to 6 μm. The thickness of the second silver-plating layer 18 is preferably 0.1 to 10 μm, more preferably 0.2 to 8 μm and most preferably 0.3 to 6 μm.

The zinc-plating layer 16 is made of 95% by weight or more (preferably 99% by weight or more) of zinc, and may contain small amounts of other elements than zinc (for example, elements due to impurities and so forth). The thickness of the zinc-plating layer 16 is preferably 0.1 to 5 μm, more preferably 0.2 to 3 μm and most preferably 0.3 to 2 μm. The ratio of the thickness of the first silver-plating layer 14 to the thickness of the zinc-plating layer 16 is preferably 0.1 to 10 and more preferably 0.3 to 9.

The underlying plating layer 12 is preferably made of nickel or a nickel alloy. The thickness of the underlying layer 12 is preferably 0.1 to 5 μm and more preferably 0.3 to 3 μm.

The base material 10 is preferably copper or a copper alloy. The Vickers hardness of the silver-plated product is preferably 80 to 220, more preferably 120 to 200 and most preferably 130 to 180.

In the preferred embodiment of a method for producing the silver-plated product shown in FIG. 1, the base material 10 of copper or the copper alloy is electroplated to form the underlying plating layer 12 of nickel or the nickel alloy, the first silver-plating layer 14 of silver, the zinc-plating layer 16 of zinc serving as the intermediate plating layer, and the second silver-plating layer of silver serving as the surface layer, in this order from the base material 10.

In this preferred embodiment of the method for producing the silver-plated product, the first silver-plating layer 14 and the second silver-plating layer 18 are preferably formed by electroplating in a silver-plating solution of an aqueous solution containing silver potassium cyanide, potassium cyanide and potassium selenocyanate.

EXAMPLES

Examples of a silver-plated product and a method for producing the same according to the present invention will be described below in detail.

Example 1

First, a rolled sheet of oxygen-free copper (C1020 1/2H) having a size of 67 mm×50 mm×0.3 mm was prepared as a base material (a material to be plated). As the pretreatment of the material, the material and a SUS plate were put in an alkali degreasing solution to be used as a cathode and an anode, respectively, to carry out electrolytic degreasing at 5 V for 30 seconds. The material thus electrolytic-degreased was washed with water, and then, pickled for 15 seconds in a 3% sulfuric acid.

Then, the material thus pretreated and a nickel electrode plate were used as a cathode and an anode, respectively, to electroplate (dull-nickel-plate) the material at a liquid temperature of 55° C. and at a current density of 5 A/dm$^2$ for 80 seconds in a dull-nickel-plating solution of an aqueous solution containing 540 g/L of nickel sulfamate tetrahydrate, 25 g/L of nickel chloride and 35 g/L of boric acid, while stirring the solution at 500 rpm by means of a stirrer. After a dull-nickel-plating film having a thickness of 1 μm was thus formed as an underlying plating film, it was washed with water.

Then, the material having the underlying plating film and a titanium electrode plate coated with platinum were used as a cathode and an anode, respectively, to electroplate the material at a room temperature (25° C.) and at a current density of 1.4 A/dm$^2$ for 10 seconds in a silver strike plating solution of an aqueous solution containing 3 g/L of silver potassium cyanide (KAg(CN)$_2$) and 90 g/L of potassium cyanide (KCN), while stirring the solution at 500 rpm by means of a stirrer. After a silver strike plating film was thus formed, it was washed with water for sufficiently washing away the silver strike plating solution.

Then, the material having the silver-strike-plating film and a silver electrode plate were used as a cathode and an anode, respectively, to electroplate (first silver-plate) the material at a liquid temperature of 18° C. and at a current density of 5 A/dm$^2$ for 20 seconds in a silver-plating solution of an aqueous solution containing 175 g/L of silver potassium cyanide (KAg(CN)$_2$), 95 g/L of potassium cyanide (KCN) and 102 mg/L of potassium selenocyanate (KSeCN), while stirring the solution at 500 rpm by means of a stirrer. After a first silver-plating film (lower silver-plating film) having a thickness of 1 μm was thus formed, it was washed with water.

Then, the material having the first silver-plating film and a titanium electrode plate coated with platinum were used as a cathode and an anode, respectively, to electroplate the material at a liquid temperature of 25° C. and at a current density of 5 A/dm$^2$ for 20 seconds in a zinc plating solution of an aqueous solution containing 42 g/L of zinc oxide (ZnO), 120 g/L of potassium cyanide (KCN) and 116 g/L of potassium hydroxide (KOH), while stirring the solution at 500 rpm by means of a stirrer. After a zinc-plating film having a thickness of 0.5 μm was thus formed as an intermediate plating film, it was washed with water. Furthermore, the ratio of the thickness of the first silver-plating film to the thickness of the zinc-plating film was 2 in this example.

Then, the material having the zinc-plating film and a silver electrode plate were used as a cathode and an anode, respectively, to electroplate (second silver-plate) the material at a liquid temperature of 18° C. and at a current density of 5 A/dm$^2$ for 75 seconds in a silver-plating solution of an aqueous solution containing 175 g/L of silver potassium cyanide (KAg(CN)$_2$), 95 g/L of potassium cyanide (KCN) and 102 mg/L of potassium selenocyanate (KSeCN), while stirring the solution at 500 rpm by means of a stirrer. After a second silver-plating film (upper silver-plating film) having a thickness of 3.5 μm was thus formed, it was washed with water and then dried.

The Vickers hardness HV of the surface of the silver-plated product thus obtained was measured in accordance with JIS Z2244 by applying a measuring load of 10 gf for 10 seconds by means of a micro-hardness testing machine (HM-221 produced by Mitutoyo Corporation). As a result, the Vickers hardness HV was 132.

Two silver-plated products, each of which was the same as the above-described silver-plated product, were prepared, one of the silver-plated products being indented (Inside R=1.5 mm) to be used as an indenter, and the other of the silver-plated products being used as a plate-shaped evaluation sample. Then, the minute sliding movements (sliding distance=0.1 mm, sliding speed=0.2 mm/s) were continued while the indenter was pushed against the evaluation sample at a constant load (5N) by means of a precision sliding testing apparatus (CRS-G2050-DWA produced by Yamasaki-Seiki Laboratory Co., Ltd.), and the number of times of the reciprocating minute sliding movements was counted when the contact resistance exceeded 0.5 mΩ. As a result, when the number of times of the reciprocating minute sliding movements was 6,000 times, the contact resistance exceeded 0.5 m Ω, so that it was found that the minute sliding abrasion resistance property was good.

Example 2

A silver-plated product was produced by the same method as that in Example 1, except that the electroplating time for forming the first silver-plating film was 90 seconds and that the electroplating time for forming the second silver plating film was 10 seconds. The thicknesses of the dull-nickel-plating film, first silver-plating film, zinc-plating film and second silver-plating film of the silver-plated product were 1 μm, 4 μm, 0.5 μm and 0.5 μm, respectively. Furthermore, the ratio of the thickness of the first silver-plating film to the thickness of the zinc-plating film was 8 in this example.

With respect to the silver-plated product thus obtained, the measurement of the Vickers hardness HV of the silver-plating film and the evaluation of the minute sliding abrasion resistance property thereof were carried out by the same methods as those in Example 1. As a result, the Vickers hardness HV was 147. When the number of times of the reciprocating minute sliding movements was 10,000 times, the contact resistance exceeded 0.5 mΩ, so that it was found that the minute sliding abrasion resistance property was good.

Example 3

A silver-plated product was produced by the same method as that in Example 1, except that the electroplating time for forming the first silver-plating film was 75 seconds and that the electroplating time for forming the second silver plating film was 20 seconds. The thicknesses of the dull-nickel-plating film, first silver-plating film, zinc-plating film and second silver-plating film of the silver-plated product were 1 μm, 3.5 μm, 0.5 μm and 1 μm, respectively. Furthermore, the ratio of the thickness of the first silver-plating film to the thickness of the zinc-plating film was 7 in this example.

With respect to the silver-plated product thus obtained, the measurement of the Vickers hardness HV of the silver-plating film and the evaluation of the minute sliding abrasion resistance property thereof were carried out by the same methods as those in Example 1. As a result, the Vickers hardness HV was 147. When the number of times of the reciprocating minute sliding movements was 10,000 times, the contact resistance exceeded 0.5 mΩ, so that it was found that the minute sliding abrasion resistance property was good.

Example 4

A silver-plated product was produced by the same method as that in Example 1, except that the electroplating time for forming the first silver-plating film was 63 seconds and that the electroplating time for forming the second silver plating film was 30 seconds. The thicknesses of the dull-nickel-plating film, first silver-plating film, zinc-plating film and second silver-plating film of the silver-plated product were 1 μm, 3 μm, 0.5 μm and 1.5 μm, respectively. Furthermore, the ratio of the thickness of the first silver-plating film to the thickness of the zinc-plating film was 6 in this example.

With respect to the silver-plated product thus obtained, the measurement of the Vickers hardness HV of the silver-plating film and the evaluation of the minute sliding abrasion resistance property thereof were carried out by the same methods as those in Example 1. As a result, the Vickers hardness HV was 149. When the number of times of the reciprocating minute sliding movements was 9,000 times, the contact resistance exceeded 0.5 mΩ, so that it was found that the minute sliding abrasion resistance property was good.

Example 5

A silver-plated product was produced by the same method as that in Example 1, except that the electroplating time for forming the first silver-plating film was 10 seconds, that the electroplating time for forming the zinc-plating film was 40 seconds and that the electroplating time for forming the second silver plating film was 75 seconds. The thicknesses of the dull-nickel-plating film, first silver-plating film, zinc-plating film and second silver-plating film of the silver-plated product were 1 μm, 0.5 μm, 1 μm and 3.5 μm, respectively. Furthermore, the ratio of the thickness of the first silver-plating film to the thickness of the zinc-plating film was 0.5 in this example.

With respect to the silver-plated product thus obtained, the measurement of the Vickers hardness HV of the silver-plating film and the evaluation of the minute sliding abrasion resistance property thereof were carried out by the same methods as those in Example 1. As a result, the Vickers hardness HV was 152. When the number of times of the reciprocating minute sliding movements was 5,000 times, the contact resistance exceeded 0.5 mΩ, so that it was found that the minute sliding abrasion resistance property was good.

Example 6

A silver-plated product was produced by the same method as that in Example 5, except that the electroplating time for forming the first silver-plating film was 20 seconds and that the electroplating time for forming the second silver plating film was 63 seconds. The thicknesses of the dull-nickel-plating film, first silver-plating film, zinc-plating film and second silver-plating film of the silver-plated product were 1 μm, 1 μm, 1 μm and 3 μm, respectively. Furthermore, the ratio of the thickness of the first silver-plating film to the thickness of the zinc-plating film was 1 in this example.

With respect to the silver-plated product thus obtained, the measurement of the Vickers hardness HV of the silver-plating film and the evaluation of the minute sliding abrasion resistance property thereof were carried out by the same methods as those in Example 1. As a result, the Vickers hardness HV was 159. When the number of times of the reciprocating minute sliding movements was 7,000 times, the contact resistance exceeded 0.5 mΩ, so that it was found that the minute sliding abrasion resistance property was good.

Example 7

A silver-plated product was produced by the same method as that in Example 5, except that the electroplating time for forming the first silver-plating film was 75 seconds and that the electroplating time for forming the second silver plating film was 10 seconds. The thicknesses of the dull-nickel-plating film, first silver-plating film, zinc-plating film and second silver-plating film of the silver-plated product were 1 μm, 3.5 μm, 1 μm and 0.5 μm, respectively. Furthermore, the ratio of the thickness of the first silver-plating film to the thickness of the zinc-plating film was 3.5 in this example.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 159. When the number of times of the reciprocating minute sliding movements was 5,000 times, the contact resistance exceeded 0.5 mΩ, so that it was found that the minute sliding abrasion resistance property was good.

Example 8

A silver-plated product was produced by the same method as that in Example 5, except that the electroplating time for forming the first silver-plating film was 53 seconds and that the electroplating time for forming the second silver plating film was 30 seconds. The thicknesses of the dull-nickel-plating film, first silver-plating film, zinc-plating film and second silver-plating film of the silver-plated product were 1 μm, 2.5 μm, 1 μm and 1.5 μm, respectively. Furthermore, the ratio of the thickness of the first silver-plating film to the thickness of the zinc-plating film was 2.5 in this example.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 151. When the number of times of the reciprocating minute sliding movements was 5,000 times, the contact resistance exceeded 0.5 mΩ, so that it was found that the minute sliding abrasion resistance property was good.

Example 9

A silver-plated product was produced by the same method as that in Example 7, except that the electroplating time for forming the first silver-plating film was 42 seconds and that the electroplating time for forming the second silver plating film was 42 seconds. The thicknesses of the dull-nickel-plating film, first silver-plating film, zinc-plating film and second silver-plating film of the silver-plated product were 1 μm, 2 μm, 1 μm and 2 μm, respectively. Furthermore, the ratio of the thickness of the first silver-plating film to the thickness of the zinc-plating film was 2 in this example.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 155. When the number of times of the reciprocating minute sliding movements was 10,000 times, the contact resistance exceeded 0.5 mΩ, so that it was found that the minute sliding abrasion resistance property was good.

Comparative Example 1

A silver-plated product was produced by the same method as that in Example 7, except that the first silver-plating film was not formed and that the electroplating time for forming the second silver plating film was 90 seconds. The thicknesses of the dull-nickel-plating film, first silver-plating film, zinc-plating film and second silver-plating film of the silver-plated product were 1 μm, 0 μm, 1 μm and 4 μm, respectively. Furthermore, the ratio of the thickness of the first silver-plating film to the thickness of the zinc-plating film was 0 in this comparative example.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 144. When the number of times of the reciprocating minute sliding movements was 1,000 times, the contact resistance exceeded 0.5 mΩ, so that it was found that the minute sliding abrasion resistance property was bad.

Comparative Example 2

A silver-plated product was produced by the same method as that in Example 1, except that the electroplating time for forming the first silver plating film was 105 seconds and that the zinc-plating film and the second silver-plating film were not formed. The thicknesses of the dull-nickel-plating film, first silver-plating film, zinc-plating film and second silver-plating film of the silver-plated product were 1 μm, 5 μm, 0 μm and 0 μm, respectively.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 134. When the number of times of the reciprocating minute sliding movements was 3,000 times, the contact resistance exceeded 0.5 mΩ, so that it was found that the minute sliding abrasion resistance property was bad.

Comparative Example 3

A plated product was produced by the same method as that in Example 9, except that a copper-plating film was formed as the intermediate plating film in place of the zinc-plating film. Furthermore, the copper-plating film was formed by using the material having the first silver-plating film and a pure copper electrode plate as a cathode and an anode, respectively, to electroplate the material having the first silver-plating film at a liquid temperature of 50° C. and at a current density of 7.4 A/dm² for 50 seconds in a copper-plating solution of an aqueous solution containing 260 g/L of cuprous potassium cyanide and 8 g/L of potassium cyanide, while stirring the solution at 500 rpm by means of a stirrer. The thicknesses of the dull-nickel-plating film, first silver-plating film, copper-plating film and second silver-plating film of the silver-plated product were 1 μm, 2 μm, 1 μm and 2 μm, respectively.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 136. When the number of times of the reciprocating minute sliding movements was 2,000 times, the contact resistance exceeded 0.5 mΩ, so that it was found that the minute sliding abrasion resistance property was bad.

Comparative Example 4

A plated product was produced by the same method as that in Example 9, except that a tin-plating film was formed as the intermediate plating film in place of the zinc-plating film. Furthermore, the tin-plating film was formed by using the material having the first silver-plating film and a pure tin electrode plate as a cathode and an anode, respectively, to electroplate the material having the first silver-plating film at a liquid temperature of 25° C. and at a current density of 10 A/dm² for 20 seconds in a tin-plating solution of an aqueous solution containing a tin organic acid salt and an organic acid, while stirring the solution at 500 rpm by means of a stirrer. The thicknesses of the dull-nickel-plating film, first silver-plating film, tin-plating film and second silver-plating film of the silver-plated product were 1 μm, 2 μm, 1 μm and 2 μm, respectively.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 109. When the number of times of the reciprocating minute sliding movements was 2,000 times, the contact resistance exceeded 0.5 mΩ, so that it was found that the minute sliding abrasion resistance property was bad.

Comparative Example 5

A plated product was produced by the same method as that in Example 9, except that a nickel-plating film was formed as the intermediate plating film in place of the zinc-plating film. Furthermore, the nickel-plating film was formed by using the material having the first silver-plating film and a nickel electrode plate as a cathode and an anode, respectively, to electroplate the material having the first silver-plating film at a liquid temperature of 55° C. and at a current density of 5 A/dm² for 80 seconds in a dull-nickel-plating solution of an aqueous solution containing 540 g/L of nickel sulfamate tetrahydrate, 25 g/L of nickel chloride and 35 g/L of boric acid, while stirring the solution at 500 rpm by means of a stirrer. The thicknesses of the dull-nickel-plating film serving as the underlying plating film, first silver-plating film, nickel-plating film serving as the intermediate plating film, and second silver-plating film of the silver-plated product were 1 μm, 2 μm, 1 μm and 2 μm, respectively.

With respect to the silver-plated product thus obtained, the measurement of the Vickers hardness HV of the silver-plating film and the evaluation of the minutes sliding abrasion resistance property thereof were carried out by the same methods as those in Example 1. As a result, the Vickers hardness HV was 171. When the number of times of the reciprocating minute sliding movements was 3,000 times, the contact resistance exceeded 0.5 mΩ, so that it was found that the minute sliding abrasion resistance property was bad.

The producing conditions and characteristics of the silver-plated products obtained in these examples and comparative examples are shown in Tables 1 and 2.

TABLE 1

|  | Lower Silver-Plating Layer (μm) | Intermediate Plating Layer (μm) | Upper Silver-Plating Layer (μm) | Lower Silver-Plating Layer/ Intermediate Plating Layer |
|---|---|---|---|---|
| Ex. 1 | 1 | Zn 0.5 | 3.5 | 2 |
| Ex. 2 | 4 | Zn 0.5 | 0.5 | 8 |
| Ex. 3 | 3.5 | Zn 0.5 | 1 | 7 |
| Ex. 4 | 3 | Zn 0.5 | 1.5 | 6 |
| Ex. 5 | 0.5 | Zn 1 | 3.5 | 0.5 |
| Ex. 6 | 1 | Zn 1 | 3 | 1 |
| Ex. 7 | 3.5 | Zn 1 | 0.5 | 3.5 |
| Ex. 8 | 2.5 | Zn 1 | 1.5 | 2.5 |
| Ex. 9 | 2 | Zn 1 | 2 | 2 |

TABLE 1-continued

|  | Lower Silver-Plating Layer (μm) | Intermediate Plating Layer (μm) | Upper Silver-Plating Layer (μm) | Lower Silver-Plating Layer/ Intermediate Plating Layer |
|---|---|---|---|---|
| Comp. 1 | 0 | Zn 1 | 4 | — |
| Comp. 2 | 5 | — | — | — |
| Comp. 3 | 2 | Cu 1 | 2 | — |
| Comp. 4 | 2 | Sn 1 | 2 | — |
| Comp. 5 | 2 | Ni 1 | 2 | — |

TABLE 2

|  | Vickers Hardness HV | Number of Durable Times (Number of Times) |
|---|---|---|
| Ex. 1 | 132 | 6000 |
| Ex. 2 | 147 | 10000 |
| Ex. 3 | 147 | 10000 |
| Ex. 4 | 149 | 9000 |
| Ex. 5 | 152 | 5000 |
| Ex. 6 | 159 | 7000 |
| Ex. 7 | 159 | 5000 |
| Ex. 8 | 151 | 5000 |
| Ex. 9 | 155 | 10000 |
| Comp. 1 | 144 | 1000 |
| Comp. 2 | 134 | 3000 |
| Comp. 3 | 136 | 2000 |
| Comp. 4 | 109 | 2000 |
| Comp. 5 | 171 | 3000 |

DESCRIPTION OF REFERENCE NUMBERS

10 Base Material
12 Underlying Plating Layer
14 First Silver-Plating Layer
16 Intermediate Plating Layer
18 Second Silver-Plating Layer

The invention claimed is:

1. A silver-plated product comprising:
a base material made of copper or a copper alloy;
a first silver-plating layer;
a zinc-plating layer serving as an intermediate plating layer; and
a second silver-plating layer serving as a surface layer, and
wherein the first silver-plating layer, the zinc-plating layer and the second silver-plating layer are formed in this order from the base material.

2. A silver-plated product as set forth in claim 1, wherein said first silver-plating layer has a thickness of 0.1 to 10 μm.

3. A silver-plated product as set forth in claim 1, wherein said zinc-plating layer has a thickness of 0.1 to 5 μm.

4. A silver-plated product as set forth in claim 1, wherein a ratio of a thickness of said first silver-plating layer to a thickness of said zinc-plating layer is 0.1 to 10.

5. A silver-plated product as set forth in claim 1, wherein said second silver-plating layer has a thickness of 0.1 to 10 μm.

6. A silver-plated product as set forth in claim 1, wherein an underlying plating layer is formed between said base material and said first silver-plating layer.

7. A silver-plated product as set forth in claim 6, wherein said underlying plating layer is made of nickel or a nickel alloy.

8. A silver-plated product as set forth in claim 6, wherein said underlying plating layer has a thickness of 0.1 to 5 μm.

9. A method for producing a silver-plated product as set forth in claim 1, the method comprising the steps of:
preparing a base material; and
causing the base material to have a first silver-plating layer, a zinc-plating layer serving as an intermediate plating layer, and a second silver-plating layer serving as a surface layer,
wherein the first silver-plating layer, the zinc-plating layer, and the second silver-plating layer are formed by electroplating in this order from the base material.

10. A method for producing a silver-plated product as set forth in claim 9, wherein said first silver-plating layer and said second silver-plating layer are formed by electroplating in a silver-plating solution of an aqueous solution containing silver potassium cyanide, potassium cyanide and potassium selenocyanate.

11. A method for producing a silver-plated product as set forth in claim 9, wherein said first silver-plating layer has a thickness of 0.1 to 10 μm.

12. A method for producing a silver-plated product as set forth in claim 9, wherein said zinc-plating layer has a thickness of 0.1 to 5 μm.

13. A method for producing a silver-plated product as set forth in claim 9, wherein a ratio of a thickness of said first silver-plating layer to a thickness of said zinc-plating layer is 0.1 to 10.

14. A method for producing a silver-plated product as set forth in claim 9, wherein said second silver-plating layer has a thickness of 0.1 to 10 μm.

15. A method for producing a silver-plated product as set forth in claim 9, wherein an underlying plating layer is formed by electroplating between said base material and said first silver-plating layer.

16. A method for producing a silver-plated product as set forth in claim 15, wherein said underlying plating layer is made of nickel or a nickel alloy.

17. A method for producing a silver-plated product as set forth in claim 15, wherein said underlying plating layer has a thickness of 0.1 to 5 μm.

18. A silver-plated product comprising:
a base material;
a first silver-plating layer;
a zinc-plating layer serving as an intermediate plating layer; and
a second silver-plating layer serving as a surface layer,
wherein the first silver-plating layer, the zinc-plating layer and the second silver-plating layer are formed in this order from the base material, and
wherein the surface layer has a Vickers hardness HV of 80 to 220, the Vickers hardness HV being measured in accordance with JIS Z2244 by applying a measuring load of 10 gf for 10 seconds.

19. A silver-plated product as set forth in claim 18, wherein said first silver-plating layer has a thickness of 0.1 to 10 μm.

20. A silver-plated product as set forth in claim 18, wherein said zinc-plating layer has a thickness of 0.1 to 5 µm.

21. A silver-plated product as set forth in claim 18, wherein a ratio of a thickness of said first silver-plating layer to a thickness of said zinc-plating layer is 0.1 to 10.

22. A silver-plated product as set forth in claim 18, wherein said second silver-plating layer has a thickness of 0.1 to 10 µm.

23. A silver-plated product as set forth in claim 18, wherein an underlying plating layer is formed between said base material and said first silver-plating layer.

24. A silver-plated product as set forth in claim 23, wherein said underlying plating layer is made of nickel or a nickel alloy.

25. A silver-plated product as set forth in claim 23, wherein said underlying plating layer has a thickness of 0.1 to 5 µm.

\* \* \* \* \*